US012563132B2

(12) United States Patent
Mihály et al.

(10) Patent No.: US 12,563,132 B2
(45) Date of Patent: Feb. 24, 2026

(54) METHODS AND APPARATUSES FOR ESTABLISHING A TRANSPORT PROTOCOL CONNECTION

(71) Applicant: Telefonaktiebolaget LM Ericsson (publ), Stockholm (SE)

(72) Inventors: Attila Mihály, Dunakeszi (HU); Magnus Westerlund, Upplands Väsby (SE); Mirja Kuehlewind, Ludwigsburg (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 107 days.

(21) Appl. No.: 18/546,293

(22) PCT Filed: Mar. 10, 2021

(86) PCT No.: PCT/EP2021/056118

§ 371 (c)(1),
(2) Date: Aug. 14, 2023

(87) PCT Pub. No.: WO2022/188973

PCT Pub. Date: Sep. 15, 2022

(65) Prior Publication Data

US 2024/0121329 A1    Apr. 11, 2024

(51) Int. Cl.
H04L 69/326 (2022.01)
H04L 67/562 (2022.01)

(52) U.S. Cl.
CPC .......... H04L 69/326 (2013.01); H04L 67/562 (2022.05)

(58) Field of Classification Search
CPC ........................... H04L 69/326; H04L 67/562
(Continued)

(56) References Cited

U.S. PATENT DOCUMENTS 9,054,913 B1     6/2015 Franke et al.
2020/0068520 A1*  2/2020 Marri Sridhar ....... H04W 8/005

FOREIGN PATENT DOCUMENTS

EP        0956686 A1    11/1999
WO      2016111914 A1    7/2016
WO      2021076407 A1    4/2021

OTHER PUBLICATIONS

Brunstrom, S, et al., "Implementing Interfaces to Transport Services", draft-ietf-taps-impl-06, TAPS Working Group, Internet-Draft, Sep. 10, 2020, 51 pages.
(Continued)

*Primary Examiner* — Lan Dai T Truong
(74) *Attorney, Agent, or Firm* — Weisberg I.P. Law, P.A.

(57) ABSTRACT

Methods and apparatuses for establishing a transport protocol to use between a client and a sewer are disclosed. In particular there is disclosed a method a proxy, for establishing a transport protocol to use between a client and a server, the method comprising: receiving, from the client, a plurality of transport protocol setup messages; selecting at least one transport protocol setup message from the plurality of transport protocol setup messages; sending at least one transport protocol setup message to the server based on the selected at least one transport protocol setup message; and responsive to receiving from the server at least one transport protocol setup response message corresponding to a transport protocol setup message sent to the server, sending a transport protocol setup response message corresponding to a received transport protocol setup response message to the client.

20 Claims, 14 Drawing Sheets

(58) Field of Classification Search
USPC ......................................................... 709/227
See application file for complete search history.

(56) References Cited

OTHER PUBLICATIONS

Schinazi, D, et al., "Happy Eyeballs Version 2: Better Connectivity Using Concurrency", Internet Engineering Task Force (IETF), ISSN: 2070-1721, Dec. 2017, 15 pages.

* cited by examiner

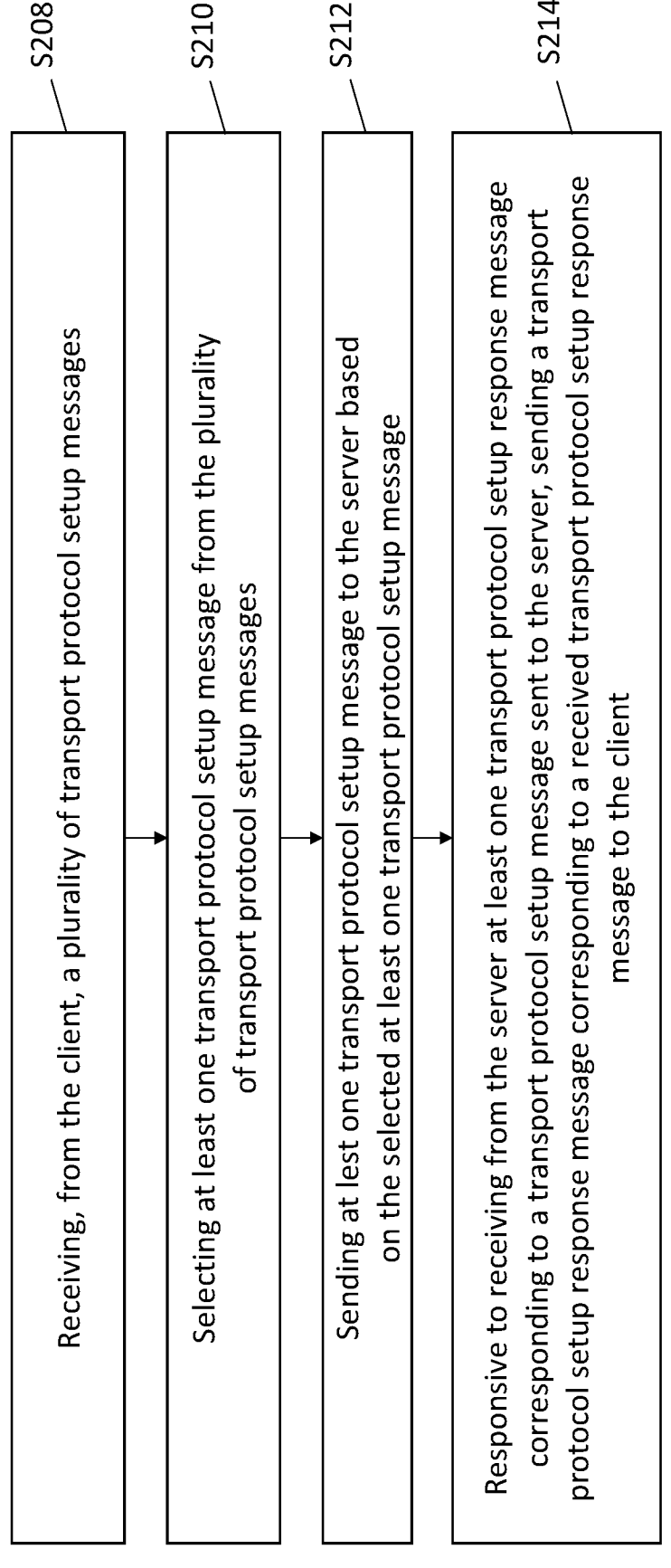

S208

Receiving, from the client, a plurality of transport protocol setup messages

S210

Selecting at least one transport protocol setup message from the plurality of transport protocol setup messages

S212

Sending at lest one transport protocol setup message to the server based on the selected at least one transport protocol setup message

S214

Responsive to receiving from the server at least one transport protocol setup response message corresponding to a transport protocol setup message sent to the server, sending a transport protocol setup response message corresponding to a received transport protocol setup response message to the client

Sending a request for a proxy service to a proxy

S318

Sending a plurality of transport protocol setup messages to the proxy

S320

Receiving from the proxy a transport protocol setup response message

S321

Establishing a connection between the client device and the server for a transport protocol corresponding to the transport protocol setup response message

METHODS AND APPARATUSES FOR ESTABLISHING A TRANSPORT PROTOCOL CONNECTION

TECHNICAL FIELD

Embodiments of the disclosure generally relate to facilitating the establishment of a transport protocol connection between a client and a server, and, more particularly, to methods and apparatuses for a proxy.

BACKGROUND

This section introduces aspects that may facilitate better understanding of the present disclosure. Accordingly, the statements of this section are to be read in this light and are not to be understood as admissions about what is in the prior art or what is not in the prior art.

The internet provides a way to transport packets from one computer to another computer. Transport protocols are used by a computer to carry application information and to send information to provide checking and correction or recovery from errors. Two examples of transport protocols are the User Datagram Protocol (UDP) and the Transmission Control Protocol (TCP).

UDP provides control information at the start of each packet to indicate what application is running, and to check if the packet has been distorted on route. UDP is typically used by applications that have no requirement for an answer, and do not need to know if the other end has received the message. A typical example of this might be a server that announces the time on the network, unsolicited.

TCP is a protocol module that provides reliability and safety. TCP is designed to cope with network failures and adapts to the available resources in the network.

QUIC is a UDP (User Datagram Protocol) based stream-multiplexed and secure transport protocol. Unlike a transport protocol stack with TCP, which resides in the operating system kernel, QUIC can easily be implemented in user space, i.e. in the application layer. As a consequence, flexibility of transport protocol evolution is improved when QUIC is used, in particular, with implementation of new features, congestion control, deployability and adoption.

QUIC is likely to become the main transport protocol in the Internet's user plane, with most applications migrating from current protocols such as HTTP/HTTPS to QUIC, with a view to improving latency and to ensure better security. Notably, encryption in QUIC covers both the transport protocol headers as well as the payload, as opposed to TLS (Transport Layer Security) over TCP, e.g. HTTPS, which protects only the payload.

QUIC's approach of integrating encryption of the transport protocol headers removes the separation between TLS (Transport Layer Security) and TCP (Transmission Control Protocol), making traditional connection splitting performance optimizations difficult without breaking end-to-end encryption, and as such presents a new challenge for currently deployed in-network traffic management solutions.

As new transport technologies are developed, such as QUIC, it is advantageous to determine the best possible transport protocol to use for communication when connecting to a peer with unknown capabilities. While newer or more evolved technologies are generally preferable, transport protocols can only be used if they are supported by the server.

One mechanism for capability discovery and transport protocol selection which is currently available is ALPN (Application-layer protocol negotiation), a TLS extension. This occurs within the TLS handshake. A list of supported application layer protocols is sent in the Client TLS Hello message and the server responds with the selected protocol in a Server Hello message. However, ALPN is used to select an application layer protocol after the transport protocol used has established a connection to server. Depending on the application protocol (ALPN) there might be one or more alternatives for transport protocol, transport protocol, versions or extensions which can be used to establish a connection to the server. Thus, the ALPN may help to reduce the potential choices for transport protocol but does not provide a method to definitively select a single transport protocol.

Alt-SVC (for example, HTTP Alternative Services) allows a client's resources to be authoritatively available at a separate network location, possibly accessed with a different protocol configuration. Alt-SVC is sent in a HTTP header field or a HTTP/2 frame type. Alt-SVC may be used to switch transport protocols, e.g., replace TCP/TLS with QUIC, but this requires a transport protocol and security context setup which results in an additional increase of connection setup time & processing. It may also result in starting with an end-to-end connection setup for QUIC and then reverting to TCP if QUIC is not supported by the server, resulting in large timeouts.

DNS SVCB (service binding and parameter specification in Domain Name System) enables protocol selection (based on DNS information) prior to connection setup. In particular, a discovery phase is conducted before the connection setup procedure.

Alternatively, the client may try to set up connections in parallel using different transport protocols and then keep the most favorable one. This is similar to the happy eyeball type of connection setup for hosts supporting both IPv4 and IPv6. However, the client initiating multiple connections in parallel represents an overload to the server, and some servers may therefore block such client requests. This also requires that the client waits to see if each response is received, which may increase the connection setup time.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for establishing a transport protocol between a client and a server.

According to a first aspect of the disclosure, there is provided a (computer implemented) method, in a proxy, for establishing a transport protocol to use between a client and a server. The method comprises receiving, from the client, a plurality of transport protocol setup messages. The method further comprises selecting at least one transport protocol setup message from the plurality of transport protocol setup messages. The method further comprises sending at least one transport protocol setup message to the server based on the selected at least one transport protocol setup message. The method further comprises, responsive to receiving from the server at least one transport protocol setup response message corresponding to a transport protocol setup message sent to the server, sending a transport protocol setup response message corresponding to a received transport protocol setup response message to the client.

By implementing such a method in a proxy, connection setup time may be reduced.

It will be appreciated that any mention of a transport protocol herein may refer to a transport protocol, transport protocol extension, transport protocol version which may correspond to any of the transport protocols mentioned herein or any other appropriate transport protocols.

At least one of the selecting and sending of the at least one transport protocol setup message may be based on information of at least one of: client connection preferences; policy relating to the client; policy relating to the server; and server capability information. The policy relating to the client may generally map to a policy related to a subscription. The policy relating to the server may map to a policy related to a $3^{rd}$ party service.

The method may further comprise ordering the plurality of transport protocol setup messages by preference based on at least one of: client connection preferences, policy relating to the client, policy relating to the server; and server capability information. The method may further comprise selecting the at least one transport protocol setup message to send to the server based on the order of preference. A transport protocol may be preferred as it may offer benefits such as improved latency and better security, and/or may be a transport protocol that is supported by both the client and the server. Therefore, a selection process may consider how important such benefits are to the client, (and/or in some cases a priori knowledge about whether the transport protocol is supported by both client and server) and select a transport protocol(s) accordingly.

The selecting of the at least one transport protocol setup message from the plurality of transport protocol setup messages may comprise selecting at least one of: a set of transport protocol setup messages; a preferred transport protocol setup message; an acceptable transport protocol setup message; a set of preferred transport protocol setup messages.

When more than one transport protocol setup response message is received from the server, the method may further comprise determining a transport protocol setup response message corresponding to one of the received transport protocol setup response messages to send to the client.

The determined transport protocol setup response message may be the transport protocol setup response message which has the highest preference from among the received at least one transport protocol setup response message.

The determined transport protocol setup response message may be determined based on information of at least one of: client connection preferences; policy relating to the client; policy relating to the server; and server capability information.

The client connection preferences may comprise at least one of: that the proxy is to send multiple transport protocol setup messages to the server in parallel; that the proxy is not to send multiple transport protocol setup messages to the server in parallel; a list of transport protocols supported by the client; a transport protocol preferred by the client; a type of transport protocol preferred by the client; a version of a transport protocol preferred by the client; an extension of a transport protocol preferred by the client; the order in which transport protocols are preferred by the client; preferences of the client with regards to server capability information. The client (or proxy) may prefer parallel setup to improve latency. The client (or proxy) may not prefer parallel setup to save bandwidth or memory state.

The policy relating to the client may comprise at least one of: that the client is permitted to use a transport protocol; the importance of latency to the client; that the proxy is not to attempt parallel connection setup to the server; that the proxy is to attempt parallel connection setup to the server.

The policy relating to the server may comprise at least one of: that the proxy is not to attempt parallel connection setup to the server; that the proxy is to attempt parallel connection setup to the server; that a preference of the proxy is to conserver bandwidth; that a preference of the proxy is to conserve memory; information on likely transport protocol success; information on the local state of the proxy.

The server capability information may comprise at least one of: information indicating a transport protocol supported by the server; one or more transport protocol preferred by the server.

The information may be obtainable from at least one of: pre-configured information in the proxy, cached information in the proxy, information on prior connections with at least one client, information on prior connections with the server, information on performance measurements of the server, a database (e.g. a database shared between multiple proxy instances), a policy server, the client.

The method may further comprise receiving, from a client, the client connection preferences relating to at least one transport protocol.

The method may further comprise, if no transport protocol setup response message is received from the server, indicating a connection error to the client.

The method may further comprise waiting for a predetermined period of time (e.g. by starting a timer) to receive a transport protocol setup response message from the server, and responsive to receiving the transport protocol setup response message within the predetermined period of time, sending the received transport protocol setup response message to the client.

When the proxy is not to send messages in parallel to the server, the sending the at least one transport protocol setup message to the server may comprise sending a preferred transport protocol setup message to the server. The method may comprise, responsive to receiving from the server a preferred transport protocol setup response message corresponding to the preferred transport protocol setup message within a first period of time, sending the preferred transport protocol setup response message to the client.

The method may further comprise, responsive to not receiving from the server a preferred transport protocol setup response message corresponding to the preferred transport protocol setup within the first period of time, sending an acceptable transport protocol setup message to the server. The method may further comprise, responsive to receiving from the server an acceptable transport protocol setup response message corresponding to the acceptable transport protocol setup message, sending the acceptable transport protocol setup response message to the client.

When the proxy is to send messages in parallel to the server, the sending the at least one transport protocol setup message to the server may comprise sending a preferred transport protocol setup message and an acceptable protocol setup message to the server. The method may further comprise, responsive to receiving from the server an acceptable transport protocol setup response message corresponding to the acceptable transport protocol setup message, starting a first timer for a first period of time. The method may further comprise, responsive to receiving from the server a preferred transport protocol setup response message corresponding to the preferred transport protocol setup message within the first period of time, sending the preferred transport protocol setup response message to the client. The method may further comprise, responsive to not receiving from the server a preferred transport protocol setup response message corresponding to the preferred transport protocol setup within the first period of time, sending the acceptable transport protocol setup response message to the client.

The method may further comprise establishing a proxy connection with the client.

The proxy connection between the client and the proxy may be a QUIC connection.

A transport protocol setup message (a transport protocol setup message and/or a transport protocol setup response message) (of the at least one transport protocol setup message) may correspond to at least one of: QUIC; proprietary transport protocol; stream control transmission protocol, SCTP; and transmission control protocol, TCP. The connection between the client and the proxy may use a different transport protocol to the connection between the client and the server. For example, there may be a QUIC connection between the client and the proxy, a TCP between the proxy and the server, and TLS between the client and the server.

Each transport protocol setup message may correspond to one of: a transport protocol, a transport protocol version, a transport protocol type, a transport protocol extension.

According to a further aspect of the disclosure, there is provided a method in a client for establishing a transport protocol to use between the client and a server. The method comprises sending a request for a proxy service to a proxy. The method further comprises sending a plurality of transport protocol setup messages to the proxy. The method further comprises receiving from the proxy a transport protocol setup response message. The method further comprises establishing a connection between the client and the server for a transport protocol corresponding to the transport protocol setup response message.

The method may further comprise sending to the proxy client connection preferences.

The client connection preferences may comprise at least one of: that the proxy is to send multiple transport protocol setup messages to the server in parallel; that the proxy is not to send multiple transport protocol setup messages to the server in parallel; a list of transport protocols supported by the client; a transport protocol preferred by the client; a type of transport protocol preferred by the client; a version of a transport protocol preferred by the client; an extension of a transport protocol preferred by the client; the order in which transport protocols are preferred by the client; preferences of the client with regards to server capability information.

The method may further comprise sending the at least one transport protocol setup message in parallel.

According to a further aspect of the disclosure there is provided a proxy comprising at least one processor; and at least one memory, the at least one memory containing instructions executable by the at least one processor. The proxy is operable to receive, from the client, a plurality of transport protocol setup messages. The proxy is further operable to select at least one transport protocol setup message from the plurality of transport protocol setup messages. The proxy is further operable to send the selected at least one transport protocol setup message to a server. The proxy is further operable to, responsive to receiving from the server at least one transport protocol setup response message corresponding to a selected transport protocol setup message sent to the server, send a received transport protocol setup response message to the client.

According to a further aspect of the disclosure, there is provided a proxy comprising a receiving module for receiving, from the client, a plurality of transport protocol setup messages. The proxy further comprises a selecting module for selecting at least one transport protocol setup message from the plurality of transport protocol setup messages. The proxy further comprises a sending module for sending the selected at least one transport protocol setup message to a server, and, responsive to receiving from the server at least one transport protocol setup response message corresponding to a transport protocol setup message sent to the server, sending a received transport protocol setup response message to the client.

The proxy may be further configured to perform the method as described herein.

According to a further aspect of the disclosure, there is provided a client comprising at least one processor; and at least one memory, the at least one memory containing instructions executable by the at least one processor. The client is operable to send a request for a proxy service to a proxy. The client is further operable to send a plurality of transport protocol setup messages to the proxy. The client is further operable to receive from the proxy a transport protocol setup response message. The client is further operable to establish a connection between the client and a server for a transport protocol corresponding to the transport protocol setup response message.

According to a further aspect of the disclosure, there is provided a client comprising a sending module for sending a plurality of transport protocol setup messages to the proxy. The client further comprises a receiving module for receiving from the proxy a transport protocol setup response message. The client further comprises a connection module for establishing a connection between the client and the server for a transport protocol corresponding to the transport protocol setup response message.

The client may be further configured to perform the methods described herein.

According to a further aspect of the disclosure, there is provided a system comprising the proxy, the client (and a server).

According to a further aspect of the disclosure, there is provided a computer program comprising instructions which, when executed on at least one processor, cause the at least one processor to carry out any of the methods described herein.

According to a further aspect of the invention, there is provided a computer program product comprising non transitory computer readable media having stored thereon the computer program.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 2 is a diagram illustrating a method in a proxy according to an example;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

A client may be a piece of computer hardware or software that accesses a service made available by a server as part of a client-server network. The server may be on another computer system, in which case the client may access the service by way of a network (or multiple networks). A client may be, for example, a client device, a program, a mobile device, a mobile terminal, and/or user equipment, UE.

A proxy (a proxy server) facilitates communication between a client and a server in a communication system. A proxy may reside on the client's local computer, or at any point between the client's computer and destination servers on the internet. A proxy may be a server application or appliance (program) that may act as an intermediary for requests from clients seeking resources from servers that provide those resources. A proxy may act as both server and client, creating or relaying requests on behalf of other entities. Requests may be serviced internally or by passing them on, with possible translation, to other servers. In the case of establishing a transport protocol to use between a client and a server, a proxy typically forwards decisions of the client and server, but does not itself determine which transport protocol should be used between the client and the server. The examples herein describe ways in which the proxy may assist in determining a transport protocol to use between a client and a server.

There are several types of proxy. A "transparent proxy" is a proxy that intercepts the end-to-end connection transparently without requiring any special client configuration. In an "explicit proxy" configuration, the client is explicitly configured to use a proxy server. A "Performance Enhancement Proxy (PEP)" may be used to improve the performance of protocols on network paths where native performance suffers due to characteristics of a link or subnetwork on the path. The proxies referred to herein may be considered to be explicit proxies.

Figure 1:
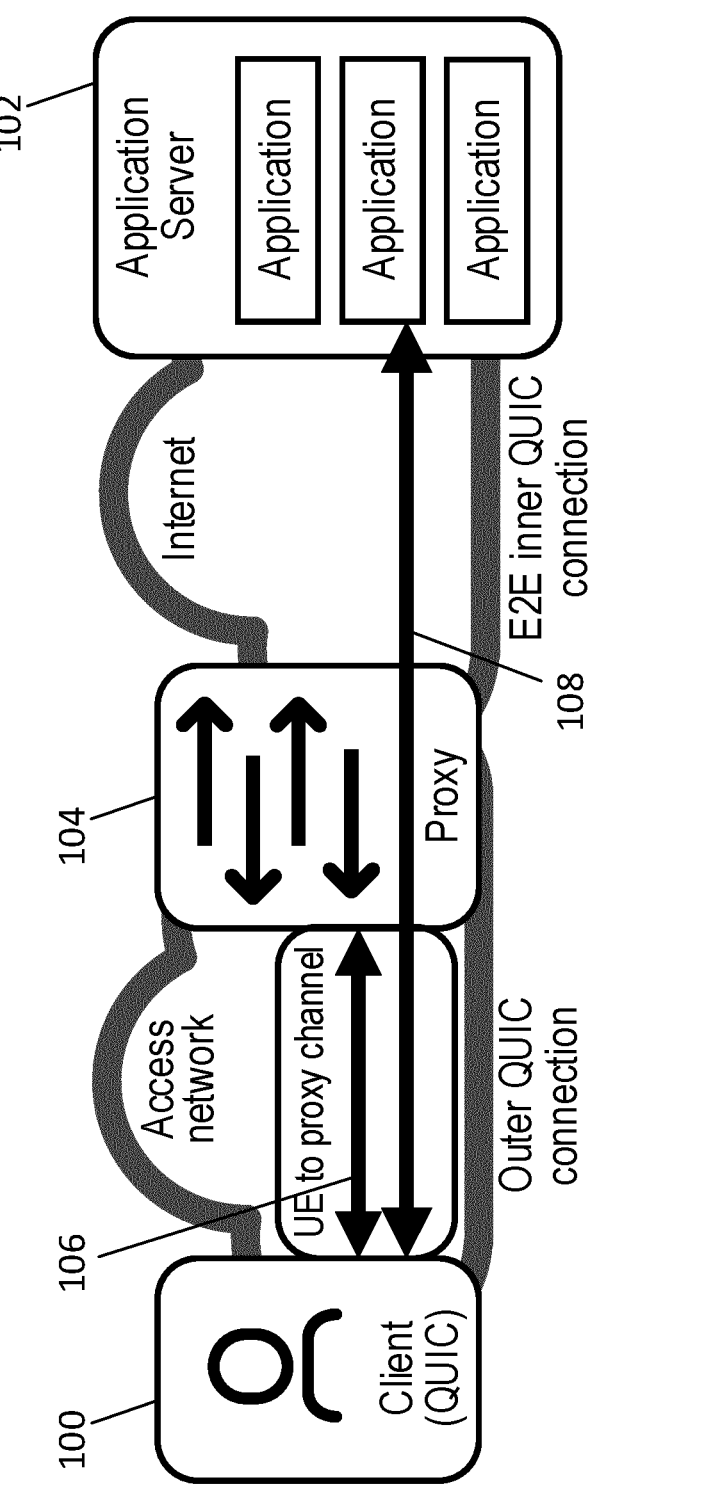
FIG. 1 is a diagram illustrating a system comprising a client, a proxy and a server.

FIG. 1 illustrates a system in which the methods described herein may be implemented. FIG. 1 illustrates a client 100 (which in this example is QUIC enabled) which is connected to a server 102 via a proxy 104. In order to establish a connection between the client 100 and the server 102, in this example the client 100 may open a connection to the proxy 104 via an access network and request forwarding of its payload traffic to a server 102. The connection may be a QUIC connection. Thus, a proxy connection may be established with the client. The proxy may forward the payload traffic to the server 102, e.g. via the internet, and an end-to-end connection between the client and the server may be established. The end-to-end connection may comprise an outer QUIC connection between the client and the proxy, and an inner QUIC connection between the proxy and the server.

It will be appreciated that the connection between the client and the proxy may be established using any mechanism which allows connection between a client and a proxy. For example, an extension of the HTTP CONNECT method to request different forwarding services is currently under development in the newly established MASQUE working group in the IETF. Examples of such services include UDP-based traffic such as QUIC itself or forwarding more generically on the IP layer, which would also include TCP end-to-end traffic.

In contrast to typical proxies which intercept the transport connection transparently, a cooperative approach to enable network-assisted performance enhancements for encrypted transport protocols may be based on a QUIC tunnel between the client and proxy that operates with full consent from the service or application on the client-side (e.g., in the mobile terminal).

Rather than intercepting any connection between client and server at the proxy, with a cooperative approach using Multiplexed Application Substrate over QUIC Encryption (MASQUE) as the signal protocol towards the proxy, there may be two layers of connections: a tunnel connection 106 between the proxy and the client and the end-to-end connection 108 between the client and the server, which may have an unmodified end-to-end security context that may guarantee confidentiality, source authentication, and integrity between the endpoints. (The end-to-end connection may be via the proxy.) As such, using QUIC-based tunneling may also establish a secure communication channel between the client, e.g. mobile terminal, and the proxy. This may also provide an opportunity to offer additional services like faster loss recovery by the proxy or exposure of up-to-date network information that can be used to assist congestion control.

While in this example a QUIC connection is used between components, it will be appreciated that any appropriate connection may be used.

FIG. 2 illustrates a method in a proxy according to an example for establishing a transport protocol to use between a client and a server. The method comprises, at step S208, receiving, from the client, a plurality of transport protocol setup messages, at step S210, selecting at least one transport protocol setup message from the plurality of transport protocol setup messages, at step 212, sending at least one transport protocol setup message to the server based on the selected at least one transport protocol setup message; and, at step 214, responsive to receiving from the server at least one transport protocol setup response message corresponding to a transport protocol setup message sent to the server, sending a transport protocol setup response message corresponding to a received transport protocol setup response message to the client.

A transport protocol message may correspond to a transport protocol, a transport protocol version, a transport protocol type, and/or a transport protocol extension. A transport protocol setup message may correspond to QUIC, proprietary transport protocol, stream control transmission protocol, SCTP, and/or transmission control protocol, TCP, for example, or any of the transport protocols mentioned herein.

A method may therefore be provided for negotiating the transport protocol to use between a client and a server with unknown capabilities. The method may assume that the client can discover and connect to a proxy and use the proxy services to facilitate the connection setup. The client may initiate connection setup to a server through the proxy by sending different sets of disjoint transport and security handshakes corresponding to different transport protocols to the proxy and indicating its connection related preferences. The proxy may then negotiate the best possible transport protocol connection to the server using pre-cached information about the server and/or client preferences.

This method is particularly advantageous when the client wants to connect to a server where the capabilities of the server are unknown to the client but may be known to the proxy based on previous connections to the same server by other clients. In particular, the proxy may use information on connections of other clients with the server to determine which connections between the client and the server are likely to be successful.

The method may enable faster (or at least an equal) connection setup time to servers with unknown capabilities. The method may also simplify connection setup for the client. It may also be easier to introduce proprietary transport protocol versions or extensions without extending the transport protocol connection setup times.

Figure 3:
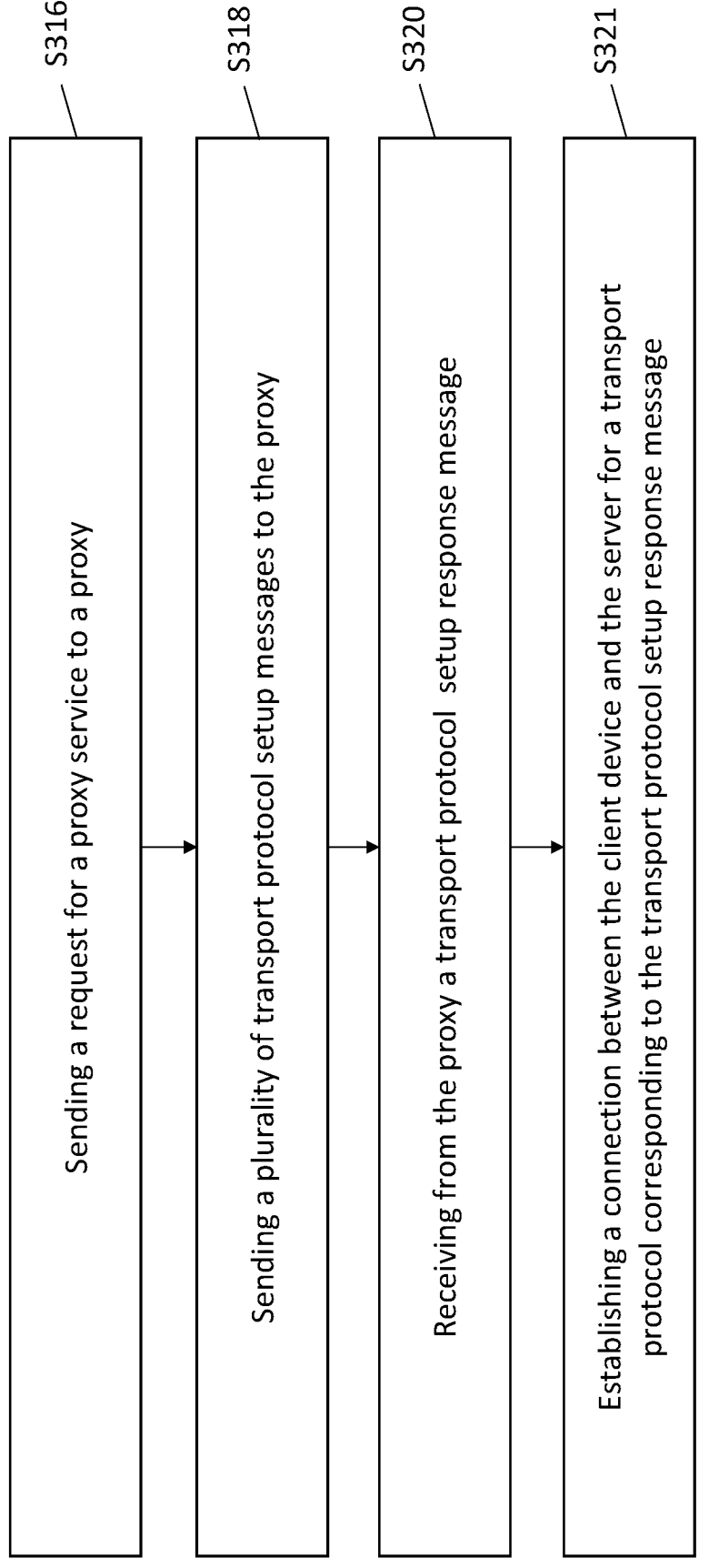
FIG. 3 is a diagram illustrating a method in a client according to an example.

FIG. 3 illustrates a method in a client according to an example for establishing a transport protocol to use between the client and a server. The method comprises, at step S316, sending a request for a proxy service to a proxy. The method further comprises, at step S318, sending a plurality of transport protocol setup messages to the proxy. The method further comprises, at step S320, receiving from the proxy a transport protocol setup response message. The method further comprises, at step S321, establishing a connection between the client and the server for a transport protocol corresponding to the transport protocol setup response message.

The client may send to the proxy client connection preferences. The client connection preferences may comprise at least one of: that the proxy is to send multiple transport protocol setup messages to the server in parallel; that the proxy is not to send multiple transport protocol setup messages to the server in parallel; a list of transport protocols supported by the client; a transport protocol preferred by the client; a type of transport protocol preferred by the client; a version of a transport protocol preferred by the client; an extension of a transport protocol preferred by the client; the order in which transport protocols are preferred by the client; preferences of the client with regards to server capability information.

The client may send the at least one transport protocol setup message in parallel.

The selecting and sending of the at least one transport protocol setup message may be based on information of at least one of: client connection preferences; policy relating to the client; policy relating to the server; and server capability information. For example, the client may prefer QUIC as the transport protocol, and the proxy may therefore send a QUIC transport protocol setup message to the server. The proxy may send other less preferred (acceptable) transport protocol setup messages to the server, such as TCP/TLS (for example, in case QUIC is not supported by the server). The client may send the information to the proxy, and/or the proxy may already have such information, and/or the proxy may obtain the information from an external source, such as a database. In particular, a proxy may have facilitated communication between other clients and the server, and may therefore have information based on prior connections (e.g., the proxy may know whether the server supports various transport protocols, such as QUIC, or preferences of similar clients). The proxy may have previously facilitated communication between the client and the server, and therefore may have information on prior connections between the client and the server. The client connection preferences relating to at least one transport protocol may be received from the client.

The proxy may order the plurality of transport protocol setup messages by preference based on at least one of: client connection preferences, policy relating to the client, policy relating to the server; and server capability information. The proxy may therefore select the at least one transport protocol setup message to send to the server based on the order of preference. The proxy may send a preferred transport protocol setup message to the server.

The selecting of the at least one transport protocol setup message from the plurality of transport protocol setup messages may comprise selecting at least one of: a set of transport protocol setup messages; a preferred transport protocol setup message; an acceptable transport protocol setup message; a set of preferred transport protocol setup messages.

It is noted that transport protocol setup messages or transport protocol setup response messages which are sent in steps of the method may be the same messages as, or may be different messages to, the received message. For example, a message sent from the proxy to the server may correspond to a message received at the proxy sent from the client (e.g. be for the same transport protocol), however, the message may be the same message or a different message. Similarly, a message sent from the server to the proxy, and a message sent from the proxy to the client, may be the same message or a different message. Examples of transport protocol messages (setup messages, setup response messages etc) include QUIC Initial, TLS Client Hello, TCP Connect with TLS Hello, TCP SYN, Syn ACK, TLS Hello, QUIC Hello. Any appropriate transport protocol setup messages (or response messages) may be used in the method.

When more than one transport protocol setup response message is received from the server, the method may further comprise determining a transport protocol setup response message corresponding to one of the received transport protocol setup response messages to send to the client. For example, the proxy may choose the message corresponding to the most optimal transport protocol. The most optimal transport protocol may be the transport protocol which is most preferred by the client out of the transport protocol responses received from the server. The determined transport protocol setup response message may be the transport protocol setup response message which has the highest preference from among the received at least one transport protocol setup response message. For example, a QUIC transport protocol may be preferred by the client to a TCP/TLS transport protocol as it may have beneficial properties for the client. However, if QUIC is not supported by the server, then the TCP/TLS transport protocol will be selected as the most optimal (conversely, if both a QUIC and TCP/TLS response messages are received, the QUIC transport protocol may be determined as the most optimal/preferable). The assessment may be based on the preference of the server or the client or both, and/or based on measurements taken of the server. The determined transport protocol setup response message may be determined based on information of at least one of: client connection preferences;

policy relating to the client; policy relating to the server; and server capability information. For example, one or any combination of these may be used by the proxy to determine the optimal transport protocol.

The client connection preferences may comprise at least one of: that the proxy is to send multiple transport protocol setup messages to the server in parallel; that the proxy is not to send multiple transport protocol setup messages to the server in parallel; a list of transport protocols supported by the client; a transport protocol preferred by the client; a type of transport protocol preferred by the client; a version of a transport protocol preferred by the client; an extension of a transport protocol preferred by the client; the order in which transport protocols are preferred by the client; preferences of the client with regards to server capability information.

The policy relating to the client may comprise at least one of: that the client is permitted to use a transport protocol; the importance of latency to the client; that the proxy is not to attempt parallel connection setup to the server; that the proxy is to attempt parallel connection setup to the server.

The policy relating to the server may comprise at least one of: that the proxy is not to attempt parallel connection setup to the server; that the proxy is to attempt parallel connection setup to the server; that a preference of the proxy is to conserver bandwidth; that a preference of the proxy is to conserve memory; information on likely transport protocol success; information on the local state of the proxy.

The server capability information may comprise at least one of: information indicating a transport protocol supported by the server; one or more transport protocol preferred by the server.

The information may be obtainable from at least one of: pre-configured information in the proxy, cached information in the proxy, information on prior connections with at least one client, information on prior connections with the server, information on performance measurements of the server, a database, a policy server, the client.

The proxy may wait for a predetermined period of time to receive a transport protocol setup response message from the server, and responsive to receiving the transport protocol setup response message within the predetermined period of time, sending the received transport protocol setup response message to the client. For example, the proxy may start a timer where the timer is set for the predetermined period of time. The timer may be started when the proxy sends the transport protocol setup message to the server. The timer may be started after receiving a transport protocol setup response message from the server.

If no transport protocol setup response message is received from the server (for example, if no transport protocol setup response message is received within a predetermined period of time), the proxy may indicate a connection error to the client.

Figure 4:
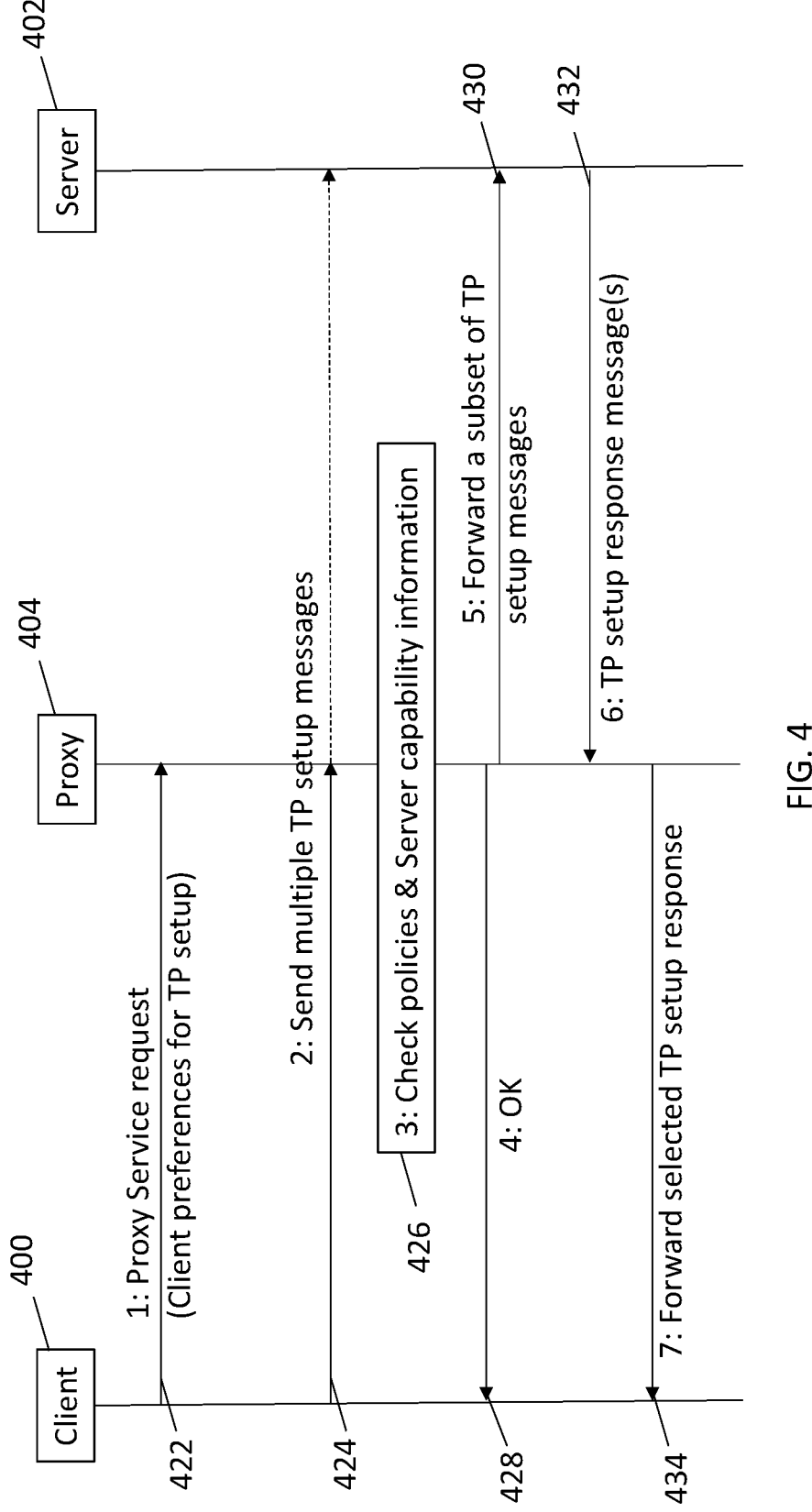
FIG. 4 is a diagram illustrating signaling according to an example.

FIG. 4 illustrates a signaling process between a client 400, proxy 404 and server 402 according to an example.

In step 1, 422, the client 400 may request a proxy service from the proxy 404 (for example, a QUIC proxy). The client may also send support for transport protocol connection setup and/or client preferences for transport protocol setup (e.g., which transport protocol type, version or extension is preferred, and/or in which order) to the proxy. The preference may indicate if the proxy may send multiple parallel transport protocol connection setup requests to the server 402. The preference may also be different depending on if the proxy has knowledge about server capabilities. The client may list all transport protocol versions it supports in order that an optimal choice can be made at the proxy, or the client may send a subset of transport protocol versions it supports (for example, if multiple requests cannot be forwarded to the server simultaneously, the client may send fewer preferences to limit transport protocol connection setup time).

In step 2, 424, the client may send a plurality of transport protocol setup messages to the proxy (as if they were sent to server). Step 2 and Step 1 may be executed at the same time, i.e., the two messages may be sent concurrently over same the client-proxy connection.

In step 3, 426, the proxy may check its policies relating to its connection with the client and if information exists relating to the capabilities of the server. This may be pre-configured or cached information, and the proxy may additionally or alternatively use external communication to a policy server or to a database (e.g. one that is shared between multiple proxy instances) to obtain this information. For example, the proxy may obtain information about prior connections of other clients with the server (obtained prior to or during the method), and may use such obtained information to determine one or more transport protocol setup messages to send to the server.

In step 4, 428, the proxy may acknowledge the proxy service request sent by the server, for example by sending an "OK" message to the client.

In step 5, 430, the proxy may forward a subset of the transport protocol setup messages received from the client to the server, based on at least one of: client preferences, policy and server capability information available. (For example, the proxy may use the aforementioned information to determine which of the transport protocols is preferable, and send the more preferable transport protocol messages to the server.) For example, the proxy may determine that there is an acceptable transport protocol and a preferred transport protocol. The preferred transport protocol may be a transport protocol that is determined to be preferable based at least one of: client connection preferences; policy relating to the client; policy relating to the server; and server capability information. For example, a QUIC transport protocol may be preferred to TCP where TCP may therefore be considered to be an acceptable (alternative) transport protocol.

The subset of transport protocol setup messages may be the same messages received from the client, or may be messages corresponding to those received from the client. The proxy may wait for a predetermined period of time for a server response, and may wait a predetermined period of time for each different transport protocol (e.g. the proxy may start one or more timers for waiting for server responses). The proxy may buffer some transport protocol setup messages, and depending on the received response, re-send some of the buffered transport protocol setup messages. Step 5 and Step 4 may be executed in parallel.

In step 6, 432, the server may send to the proxy one or more transport protocol setup response messages for transport protocols supported by the server.

In step 7, 434, the proxy may select a transport protocol setup response message and send the selected transport protocol setup response message to the client. The most optimal transport protocol may be selected considering client preferences.

Different examples are described below illustrating various methods which differ depending on client preferences for connection setup and information available in the proxy. In the following examples, QUIC and TCP are used as examples of transport protocols, where an assumption of the examples is that the client can support either TCP or one or more QUIC versions, with a preference towards using the proprietary or higher QUIC version whenever possible. However, it will be appreciated that the following examples may be used with any appropriate transport protocols and the relevant transport protocol messages, where the selection of messages is based on the methods described herein.

It will also be appreciated that in any of the examples described herein, any method may be merged with or incorporate (or replace) elements of any other method.

Figure 5:
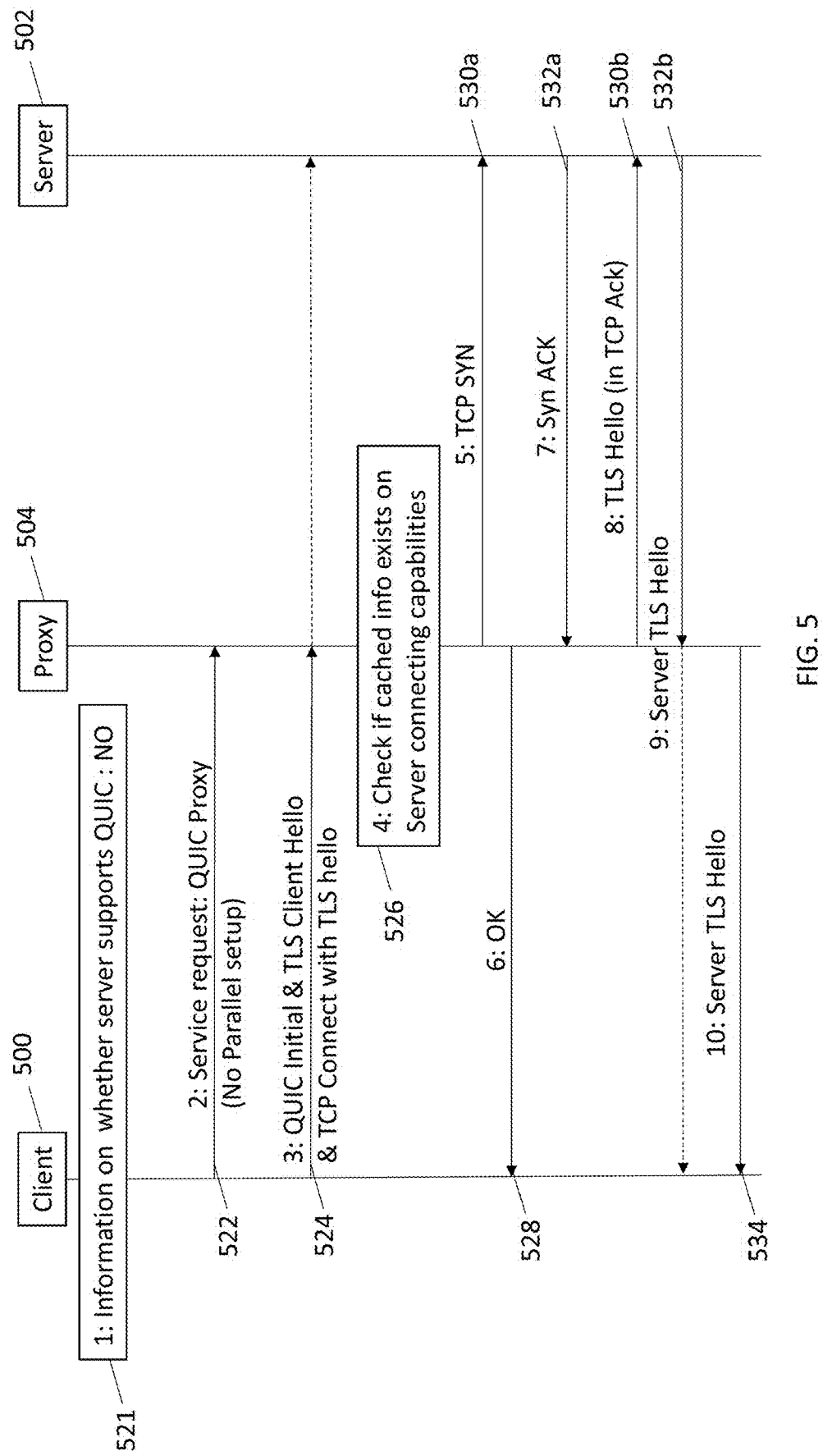
FIG. 5 is a diagram illustrating signaling according to an example.

FIG. 5 illustrates a signaling process between a client 500, proxy 504 and server 502 according to an example. In particular, FIG. 5 illustrates an example in which it is assumed that the proxy is able to use information of server capability to select transport protocols. As is described above, server capability information may exist in the proxy, e.g., based on earlier setup attempts, initiated by the same or other clients to the same or a different proxy. In the case of a different proxy, the proxy may have used external communication to a policy server or to a database that is shared between multiple proxy instances. A proxy(s) may serve many clients which may have connected to the same server previously, and therefore information on connections of these clients with the server can be used to determine which transport protocol connections are likely to be supported.

In step 1, 521, the client considers whether it has information on whether the server supports a particular transport protocol (e.g. QUIC), where in this example, the client has no information on whether the server supports QUIC. In this example, the client wants to set up a connection to the server and has performed DNS resolution which did not provide information on whether the server supports QUIC.

In step 2, 522, the client requests a QUIC proxy service from the proxy including support for transport protocol connection setup, and sends to the proxy its preference of not sending multiple connection setup to server in parallel.

In step 3, 524, the client sends to the proxy transport protocol initial messages in parallel, such as:

a) QUIC version 1's initial message including the TLS client hello in a crypto frame, b) An initial message of a newer QUIC version including the TLS Client Hello in a crypto frame, and c) a TCP Connect message with a TLS Client Hello.

In step 4, 526, the proxy checks cached or external information of server capability. In this example, the proxy determines that the server supports TCP but does not support either version of QUIC. The proxy therefore determines that does not need to send out either of the QUIC initial packets and can proceed directly with sending out TCP SYN (synchronize), which in this instance is the most optimal transport protocol (the most preferred transport protocol) (as it is the one supported by the server).

In step 5, 530*a*, the proxy sends the TCP SYN to the server.

In step 6, 528, the proxy acknowledges the client's request for proxy service in parallel with the TCP SYN message sent to the server.

In step 7, 532*a*, the server responds with the TCP SYN ACK (acknowledge).

In step 8, 530*b*, the proxy sends a TLS Hello message to the server in a TCP Ack setup message.

In step 9, 532*b*, the server responds by sending a TSL Hello message to the proxy.

In step 10, 534, the proxy forwards the TSL Hello message to the client. A TLS/TCP connection is thus established between the client and server.

The procedure may be similar if the proxy is configured with or fetches policy information related to the transport protocol for the given client and/or server (from, for example, a database). The decisions to determine which transport protocol messages to send would then also be based on policy information.

In an example, parallel setup of transport protocols is not permitted. When the proxy is not to send messages in parallel to the server, the sending the at least one transport protocol setup message to the server may comprise sending a preferred transport protocol setup message to the server. Responsive to receiving from the server a preferred transport protocol setup response message corresponding to the preferred transport protocol setup message within a first period of time, the proxy may send the preferred transport protocol setup response message to the client.

Responsive to not receiving from the server a preferred transport protocol setup response message corresponding to the preferred transport protocol setup within the first period of time, the proxy may send an acceptable transport protocol setup message to the server. Responsive to receiving from the server an acceptable transport protocol setup response message corresponding to the acceptable transport protocol setup message, the proxy may send the acceptable transport protocol setup response message to the client.

Figure 6:
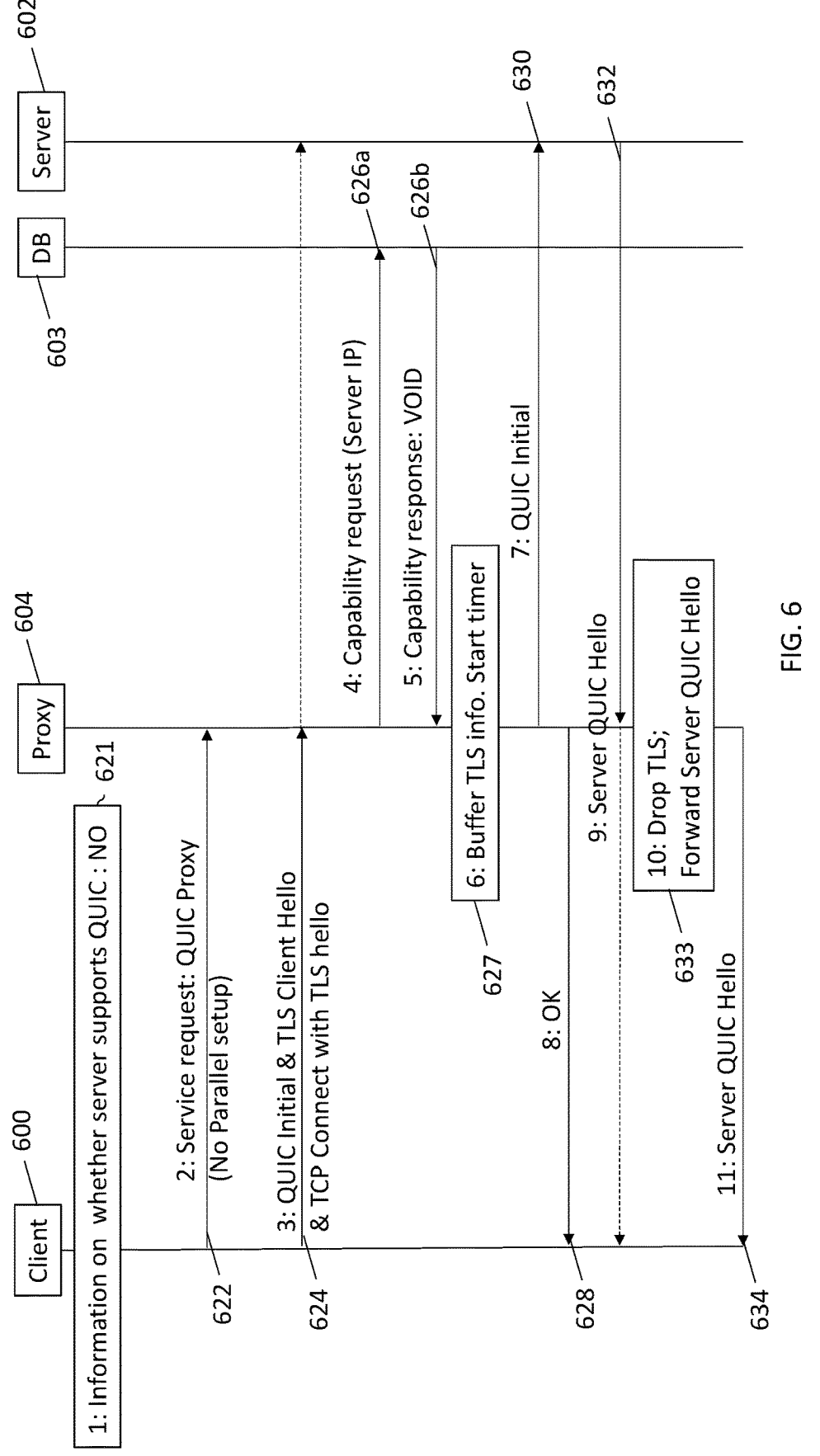
FIG. 6 is a diagram illustrating signaling according to an example.

FIG. 6 illustrates a signaling process between a client 600, proxy 604, database 603 and server 602 according to an example. In particular, FIG. 6 illustrates a situation in which a client preference is that parallel setup of transport protocols is not allowed and where the server is QUIC capable. In this variant a client preference is that the proxy should not attempt parallel connection setup to the server. The client preference may be that the proxy should not attempt parallel connection to the server as the server might consider multiple connection setups from the same IP address as DOS attack attempts. A similar method may apply if the proxy has discovered this information earlier or it has been preconfigured in the proxy as server access policy.

In step 1, 621, the client considers whether it has information on whether the server supports QUIC, where in this example, the client has no information on whether the server supports QUIC. For example, the client wants to setup a connection to the server. In this example client supports TCP or QUIC (or a particular version of QUIC such as QUIC v1) and DNS resolution performed by the client did not provide information on whether the server supports QUIC.

In step 2, 622, the client requests a QUIC proxy service from the proxy including support for transport protocol connection setup, and it sends to the proxy its preference of not sending multiple connection setup to the server in parallel.

In step 3, 624, the client sends to the proxy in parallel a QUIC initial and including TLS Client Hello, and a TCP Connect message with a TLS Client Hello.

In step 4, 626*a*, the proxy checks its policies and if information exists on the capability of the server; in this example the proxy also consults an external Database (DB) to find this information, however, it will be appreciated that the proxy may already have the required information.

In step 5, 626*b*, in this example the database response does not contain useful information about server capability.

In step 6, 627, the proxy buffers the TLS Client hello message (to be used with TCP connection to the server).

In step 7, 630, the proxy sends a QUIC initial message to the server (as the most preferred alternative), and starts a timer for awaiting the response from the server.

In step 8, 628, the proxy acknowledges the client service request (which may be performed in parallel with step 7).

In step 9, 632, the server responds with a QUIC hello message

In step 10, 633, the proxy drops the buffered TLS setup message (as the preferred transport protocol is QUIC, once the proxy received a QUIC message the TLS message can be dropped).

In step 11, 634, the proxy forwards the server QUIC Hello message to the client. Thus, the QUIC connection is established between the server and client.

Figure 7:
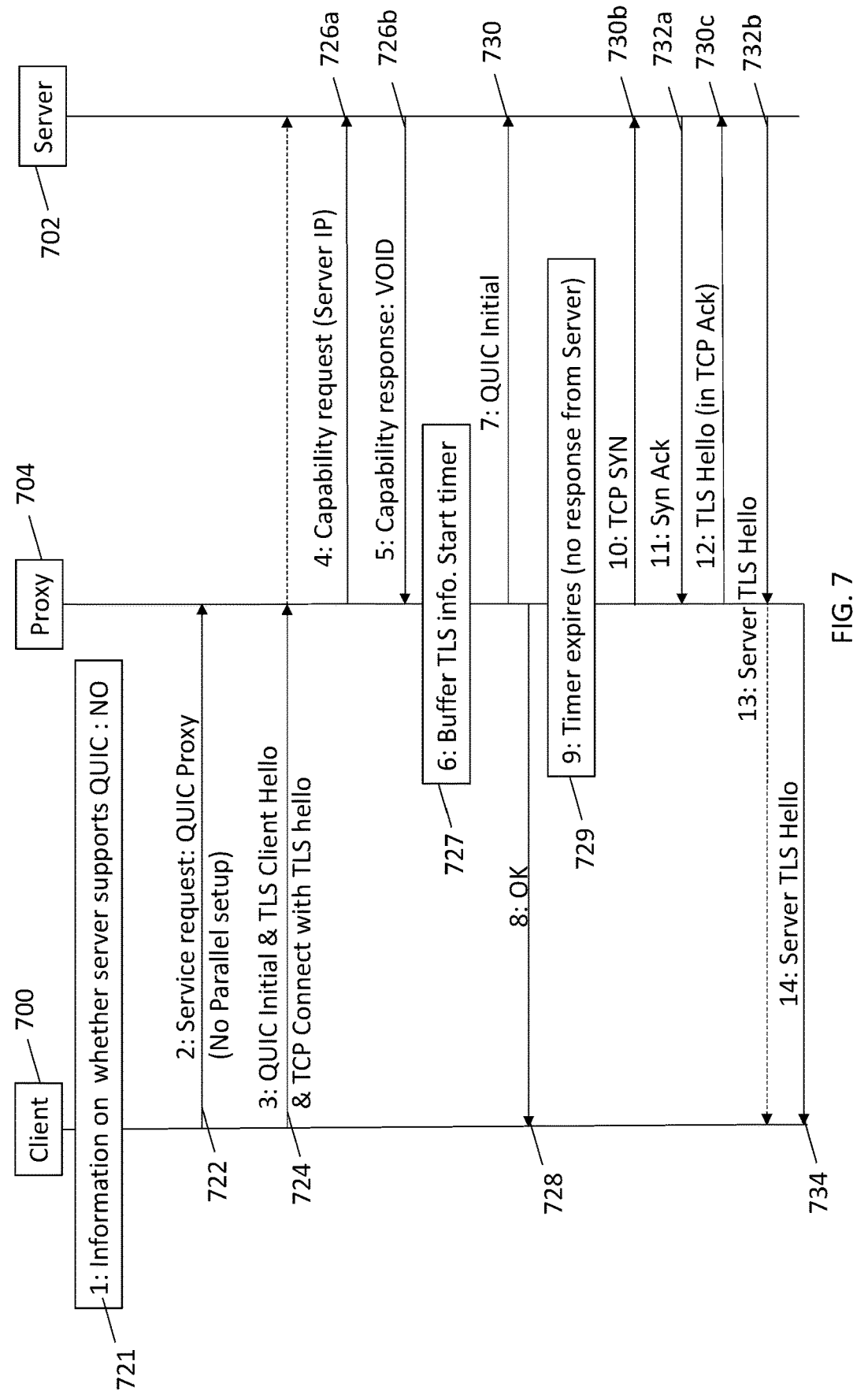
FIG. 7 is a diagram illustrating signaling according to an example.

FIG. 7 illustrates a signaling process between a client 700, proxy 704 and server 702 according to an example. In particular, FIG. 7 illustrates a situation in which a client preference is that parallel setup of transport protocols is not allowed and the server is not QUIC capable. Steps 1 to 8 of FIG. 7 are the same as steps 1 to 8 of FIG. 6 (reference numerals 621-628 correspond to reference numerals 721-728).

In step 9, 729, the timer for awaiting response from the server expires without the proxy receiving any response to the QUIC Hello message from the server.

In step 10, 730b, the proxy sends a TCP SYN message to server.

In step 11, 732a, the server responds by sending SYN Ack to the proxy.

In step 12, 730c, the proxy sends the TLS Hello message to the server in a TCP Ack setup message.

In step 13, 732b, the server responds with TSL Hello to the Proxy.

In step 14, 734, the TSL Hello is forwarded to Client. A TLS/TCP connection is thus established between the client and server.

In an example, parallel setup of transport protocols is permitted. When the proxy is to send messages in parallel to the server, the sending the at least one transport protocol setup message to the server may comprise sending a preferred transport protocol setup message and an acceptable protocol setup message to the server (the preferred and acceptable protocols may be determined in any of the ways outlined above). Responsive to receiving from the server an acceptable transport protocol setup response message corresponding to the acceptable transport protocol setup message, the proxy may start a first timer for a first period of time.

Responsive to receiving from the server a preferred transport protocol setup response message corresponding to the preferred transport protocol setup message within the first period of time, the proxy may send the preferred transport protocol setup response message to the client. Responsive to not receiving from the server a preferred transport protocol setup response message corresponding to the preferred transport protocol setup within the first period of time, the proxy may send the acceptable transport protocol setup response message to the client. It will be appreciated that this process may be repeated for any number of transport protocols.

Figure 8:
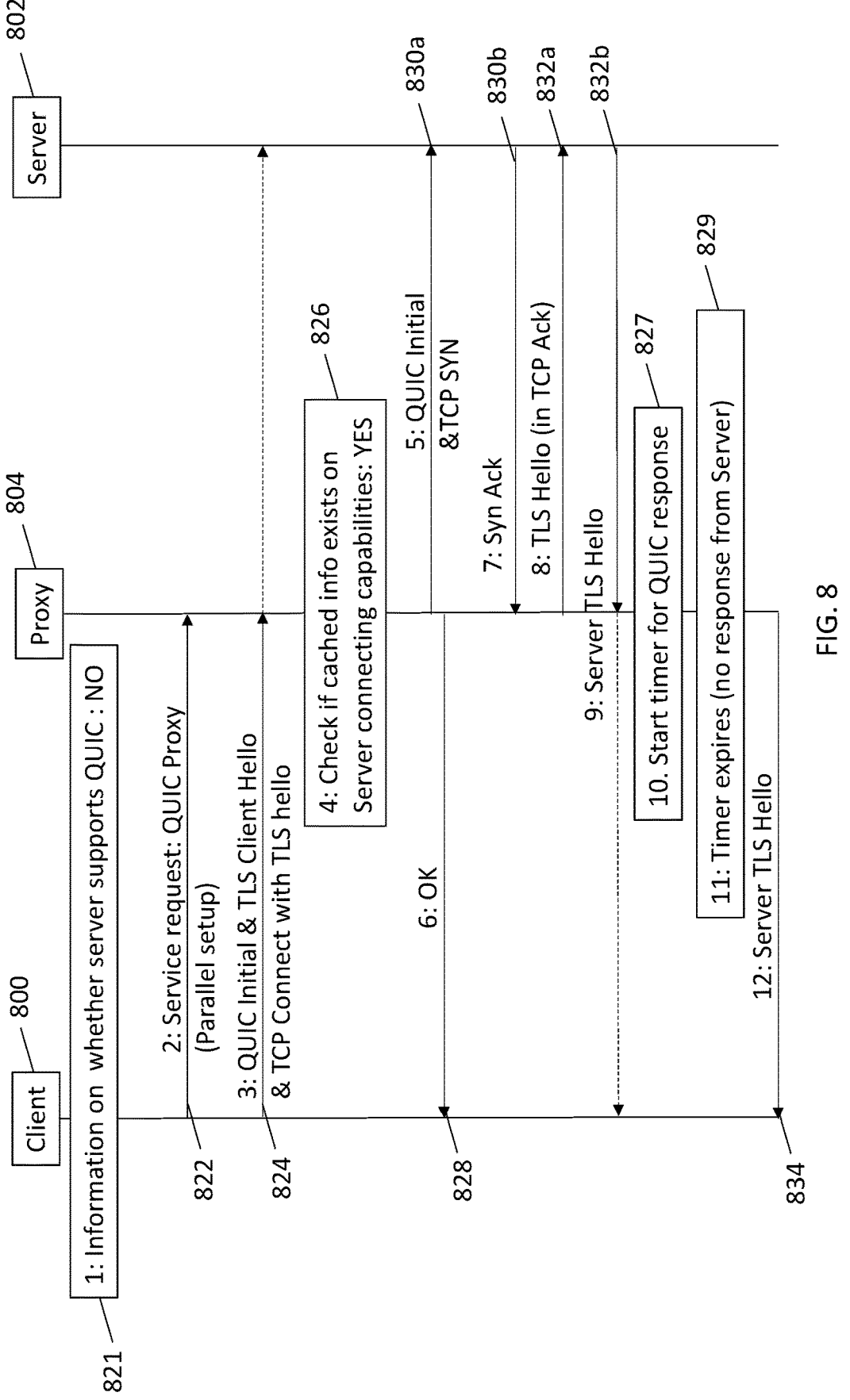
FIG. 8 is a diagram illustrating signaling according to an example.

FIG. 8 illustrates a signaling process between a client 800, proxy 804 and server 802 according to an example. In particular, FIG. 8 illustrates a configuration in which the client preference is that parallel setup is allowed. In this scenario the client allows the sending of different transport protocol setup messages in parallel from the proxy (note that Steps 1-4 (reference numerals 821-826) are the same as those in the previous sequences, e.g. FIG. 7, except that in Step 2 now a preference for parallel setup attempt is sent by the client):

In step 5, 830a, the proxy sends both TCP (TCP SYN) and QUIC setup messages to the server in parallel.

In step 6, 828, in parallel with the sending of the TCP and QUIC setup messages, the proxy also sends an acknowledgement ("OK" message) of the service request to the client.

In step 7, 832a, the server responds with the TCP SYN ACK.

In step 8, 830b, the proxy sends a TLS Hello message to the server in a TCP Ack setup message. The TLS handshake may also be sent earlier in step 5, for example, if TCP Fast Open (RFC 7413) is supported the TLS Handshake could be sent earlier in Step 5.

In step 9, 832b, the server responds with TSL Hello to the proxy.

In step 10, 827, the proxy starts a timer for awaiting the response from the Server to the QUIC Hello message. The timer started in step verifies that TCP is working, and gives the QUIC handshake additional time to complete as a more preferred protocol.

In step 11, 829, the timer expires in the proxy without receiving a response from the Server to the QUIC Hello.

In step 12, 834, the TLS Hello message received in Step 10 is forwarded to client. The proxy will start using the TCP connection previously established between the proxy and the server for this connection.

Comparing the above sequences with solutions in which there is no direct proxy involvement in the connection setup where the client also attempts sequential setup, it is apparent that proxy can speed up the connection setup time even if the same time-outs are used, because of a shorter round trip time to the server. If, in addition, the proxy has available information about the server capabilities, then this will speed up the connection setup further (for example, compare Steps 5-10 from FIG. 5 with Steps 5-11 from FIG. 8, where it is not necessary to attempt a connection for a transport protocol that is not supported by the server).

Figure 9:
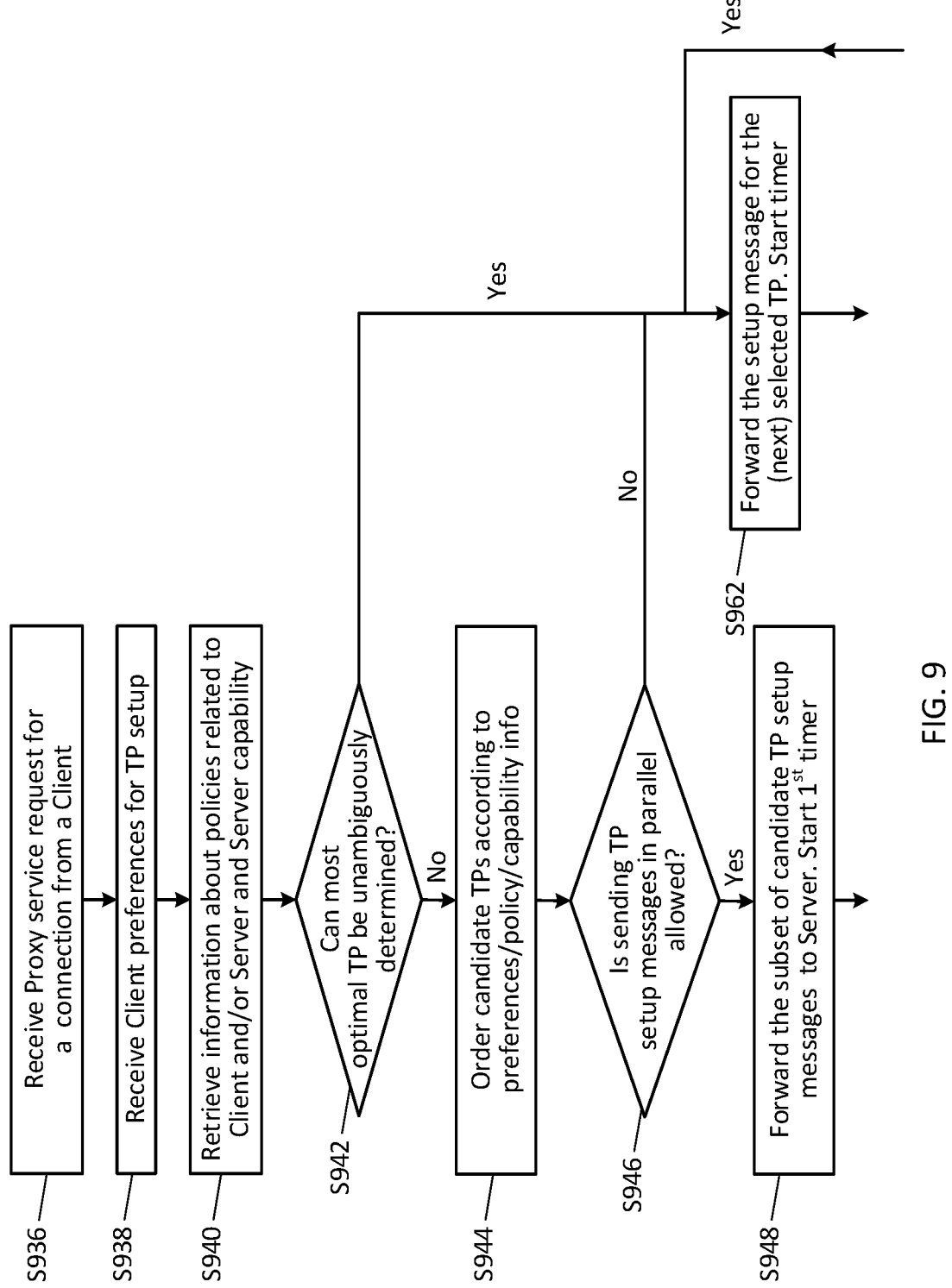
FIG. 9 is a flow diagram illustrating processes in a proxy according to an example.
Figure 9:
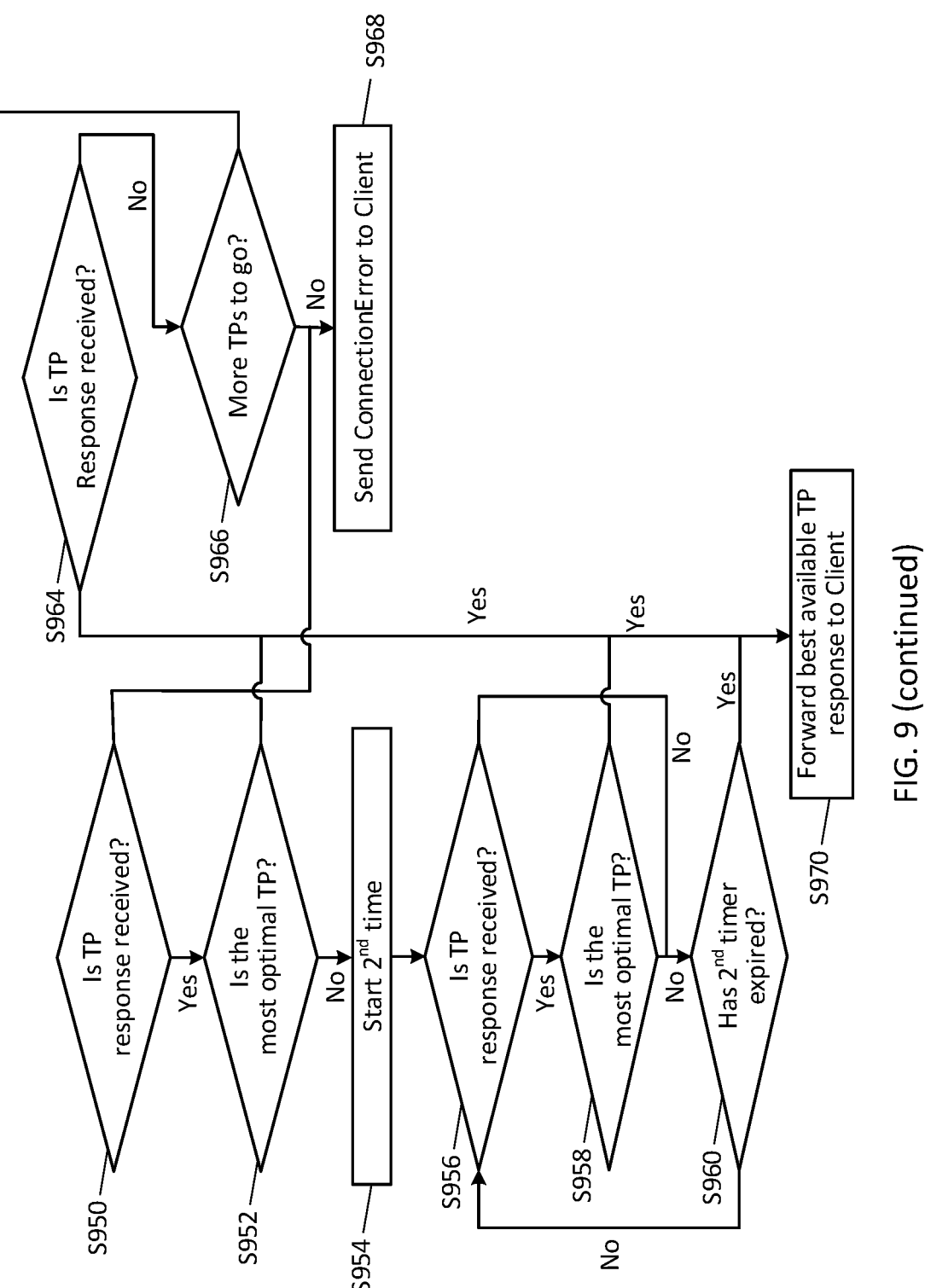

FIG. 9 illustrates the processes which may be used by the proxy in establishing a transport protocol connection between the client and the server. The proxy logic illustrated in FIG. 9 shows various different considerations which may be made by the proxy, and includes connectivity error handling. It will be appreciated that the proxy may only use some of these processes, and subsets of the processes may be arranged in any appropriate combination.

In step S936 the proxy receives a proxy service request for a connection from a client In step S938 the proxy receives client preferences for transport protocol setup.

In step S940 the proxy retrieves information about policies related to the client and/or server and server capability.

In step S942 the proxy determines whether the most optimal transport protocol can be unambiguously determined. If the proxy cannot determine the most optimal transport protocol (NO at step S942), the proxy continues to step S944. If the proxy can determine the most optimal transport protocol (YES at step S942), the proxy continues to step S962 (step S962 will be described below).

In step S944 the proxy orders candidate transport protocols according to preferences/policy/capability information (e.g. client connection preferences; policy relating to the client; policy relating to the server; and server capability information).

In step S946 the proxy determines whether sending transport protocol setup messages in parallel is allowed (e.g. based on client preferences). If sending transport protocol setup messages in parallel is allowed (YES at step S946), the process moves to step S948. If sending transport protocol setup messages in parallel is not allowed (NO at step S946), the process moves to step S962.

In step S948 the proxy forwards the subset of candidate transport protocol setup messages to the server. In this step, the proxy also starts a first timer.

In step S950 the proxy determines if a transport protocol response has been received from the server. If a transport protocol response has been received (YES at step S950), the proxy continues to step S952. If a transport protocol response is not received (NO at step S950), the proxy continues to step S968.

In step S952 the proxy determines if the received transport protocol response corresponds to the most optimal transport protocol. If the transport protocol response does not correspond to the most optimal transport protocol (NO at step S952), the proxy continues to step S954. If the transport protocol response is the most optimal (YES at step S952), the proxy continues to step S970.

In step S954 the proxy starts a second timer. The proxy then performs step S956 to determine if a transport protocol response has been received. If a transport protocol response has been received (YES in step S956), the method moves to step S958. In step S958, the proxy determines if the received transport protocol response corresponds to the most optimal transport protocol. If the received transport protocol response corresponds to the most optimal transport protocol, (YES at step S958), the proxy moves to step S970. If the transport protocol is not the most optimal transport protocol (NO at step S958), the proxy continues to step S960.

If, at step S956 it is determined that no transport protocol response has been received, the proxy continues to step S960.

In step S960 the proxy determines whether the second timer has expired. If the timer has not expired (NO at step S960), the proxy continues to step S956. If the second timer has expired (YES at step S960), the best available transport protocol response is forwarded to the client in step S970.

In step S962 the proxy forwards the setup message for the (next) selected transport protocol to the server, and a timer is started.

In step S964 it is determined if the transport protocol response has been received within the time period set by the timer. If the transport protocol response has been received (YES at step S964), the process moves to step S970, and the best available transport protocol response is forwarded to the client.

If the transport protocol response has not been received within the time period (NO at step S964), the process moves to step S966.

In step S966 it is determined if there are any more transport protocol messages that may be sent to the server. If there are (YES at step S966), the process moves back to step S962.

If at step S966 there are no more transport protocols to go (NO at step S966), the process moves to step S968, where a connection error message is sent to the client.

Figure 10:
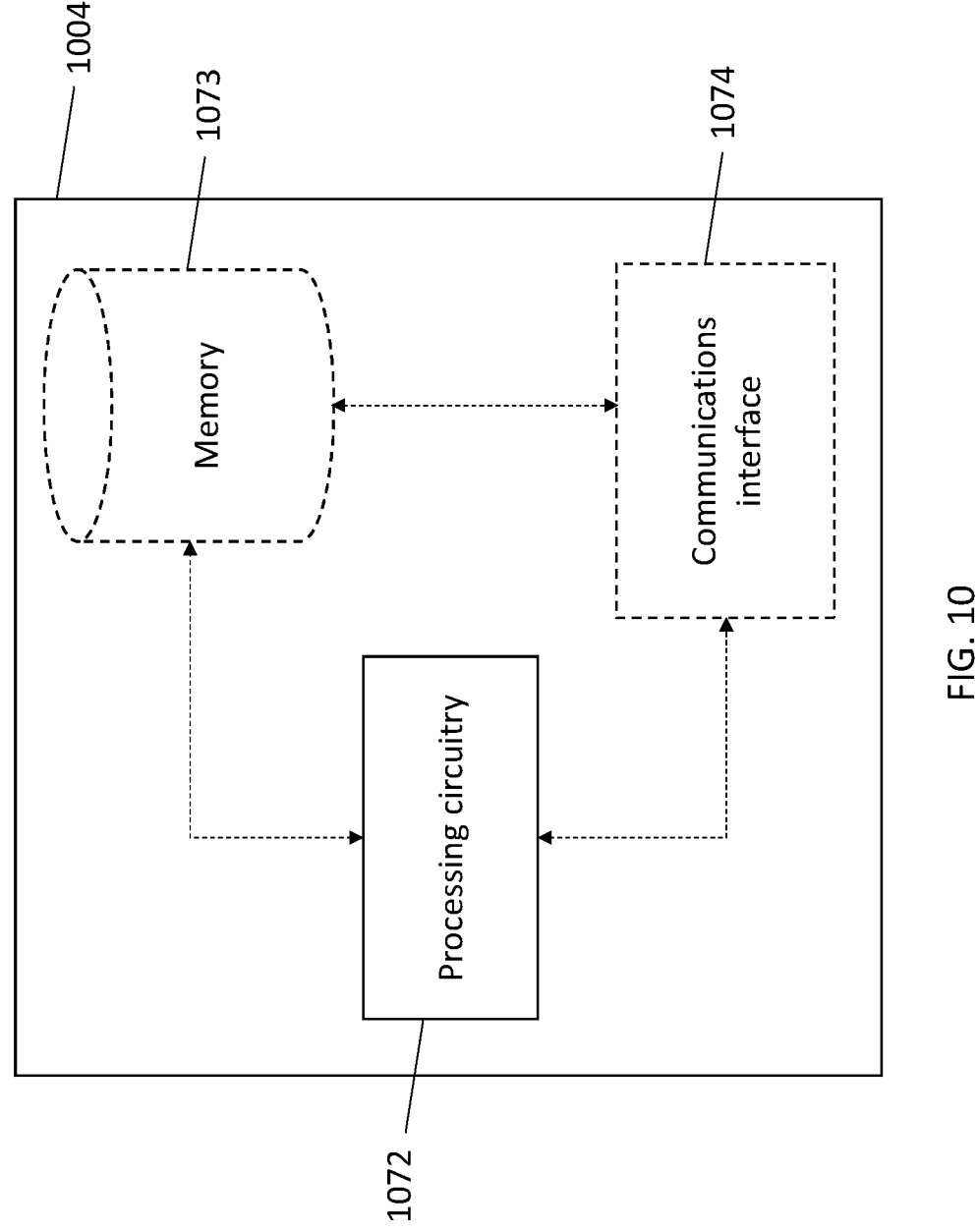
FIG. 10 is a diagram illustrating a proxy according to an example.

As illustrated in FIG. 10, in aspects of embodiments the proxy 1004 (or a server hosting the proxy) comprises proxy processing circuitry (or logic) 1072. The processing circuitry 1072 controls the operation of the proxy 1004 and can implement the method described herein in respect of the proxy 1004. The processing circuitry 1072 can be configured or programmed to control the proxy 1004 in the manner described herein. The processing circuitry 1072 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the proxy 1004. In some embodiments, the processing circuitry 1072 can be configured to run software to perform the method described herein in respect of the proxy 1004. The software may be containerised according to some embodiments. Thus, in some embodiments, the processing circuitry 1072 may be configured to run a container to perform the method described herein in respect of the proxy 1004.

Briefly, the processing circuitry 1072 of the proxy 1004 is configured to establish a transport protocol connection between a client and a server.

As illustrated in FIG. 10, in some embodiments, the proxy 1004 may optionally comprise a proxy memory 1073. The memory 1073 of the proxy 1004 can comprise a volatile memory or a non-volatile memory. In some embodiments, the memory 1073 of the proxy 1004 may comprise a non-transitory media. Examples of the memory 1073 of the proxy 1004 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 1072 of the proxy 1004 can be connected to the memory 1073 of the proxy 1004. In some embodiments, the memory 1073 of the proxy 1004 may be for storing program code or instructions which, when executed by the processing circuitry 1072 of the proxy 1004, cause the proxy 1004 to operate in the manner described herein in respect of the proxy 1004. For example, in some embodiments, the memory 1073 of the proxy 1004 may be configured to store program code or instructions that can be executed by the processing circuitry 1072 of the proxy 1004 to cause the proxy 1004 to operate in accordance with the method described herein in respect of the proxy 1004. Alternatively or in addition, the memory 1073 of the proxy 1004 can be configured to store any information, data, messages, requests, responses, indications, notifications, signals, or similar, that are described herein. The processing circuitry 1072 of the proxy 1004 may be configured to control the memory 1073 of the proxy 1004 to store information, data, messages, requests, responses, indications, notifications, signals, or similar, that are described herein.

In some embodiments, as illustrated in FIG. 10, the proxy 1004 may optionally comprise a proxy communications interface 1074. The communications interface 1074 of the proxy 1004 can be connected to the processing circuitry 1072 of the proxy 1004 and/or the memory 1073 of proxy 1004. The communications interface 1074 of the proxy 1004 may be operable to allow the processing circuitry 1072 of the proxy 1004 to communicate with the memory 1073 of the proxy 1004 and/or vice versa. Similarly, the communications interface 1074 of the proxy 1004 may be operable to allow the processing circuitry 1072 of the proxy 1004 to communicate with the client, other clients, a database, the server, over a network. The communications interface 1074 of the proxy 1004 can be configured to transmit and/or receive information, data, messages, requests, responses, indications, notifications, signals, or similar, that are described herein. In some embodiments, the processing circuitry 1072 of the proxy 1004 may be configured to control the communications interface 1074 of the proxy 1004 to transmit and/or receive information, data, messages, requests, responses, indications, notifications, signals, or similar, that are described herein. The communications interface 1074 of the proxy may be configured to communicate with the client and/or other clients and/or a database and/or the server.

Although the proxy 1004 is illustrated in FIG. 10 as comprising a single memory 1073, it will be appreciated that the proxy 1004 may comprise at least one memory (i.e. a single memory or a plurality of memories) 1073 that operate in the manner described herein. Similarly, although the proxy 1004 is illustrated in FIG. 10 as comprising a single communications interface 1074, it will be appreciated that the proxy 1004 may comprise at least one communications interface (i.e. a single communications interface or a plurality of communications interface) that operate in the manner described herein. It will also be appreciated that FIG. 10 only shows the components required to illustrate an embodiment of the proxy 1004 and, in practical implementations, the proxy 1004 may comprise additional or alternative components to those shown.

Figure 11:
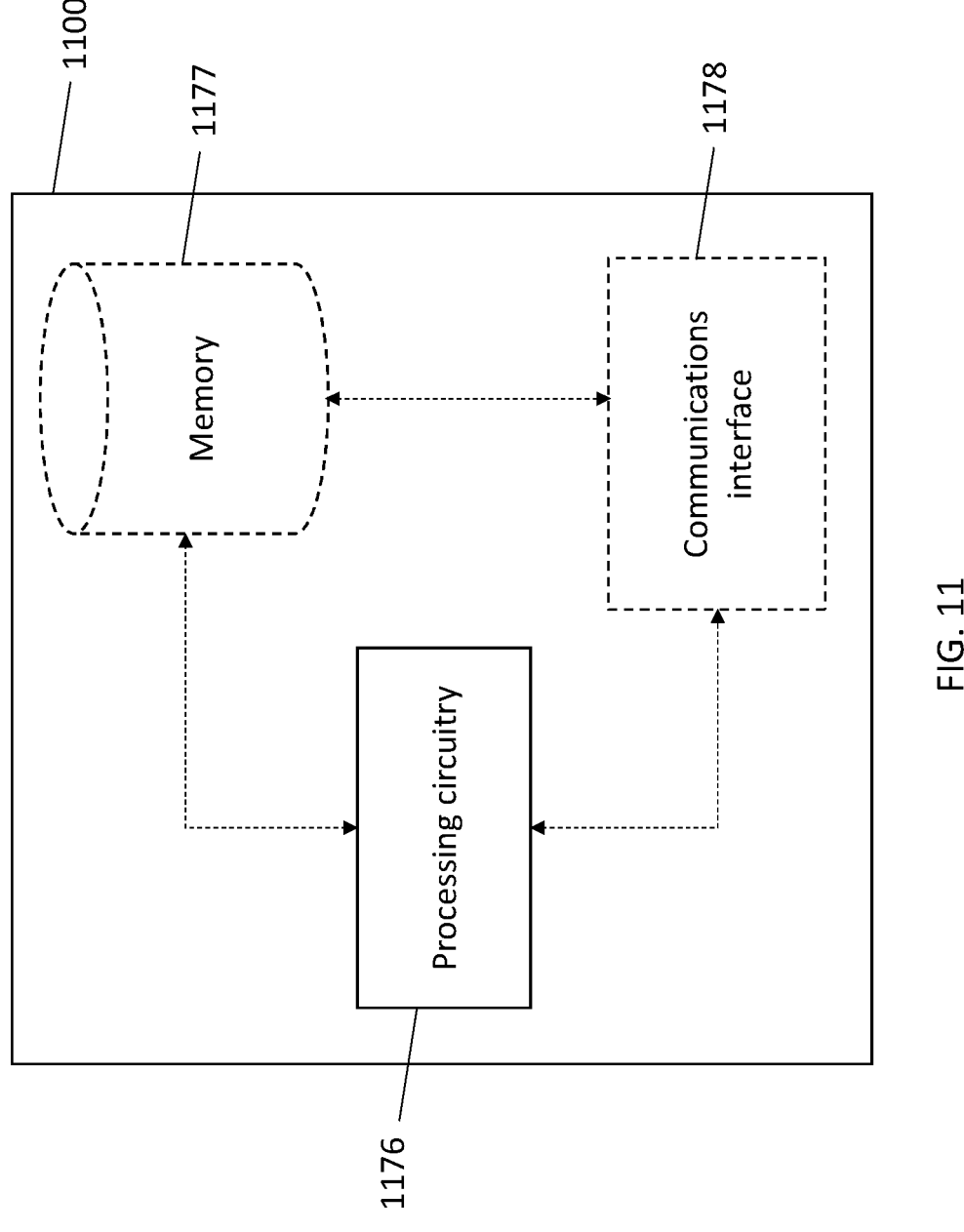
FIG. 11 is a diagram illustrating a client according to an example.

As illustrated in FIG. 11, in aspects of embodiments the client 1100 comprises client processing circuitry (or logic) 1176. The processing circuitry 1176 controls the operation of the client 1100 and can implement the method described herein in respect of the client 1100. The processing circuitry 1176 can be configured or programmed to control the client 1100 in the manner described herein. The processing circuitry 1176 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the client 1100. In some embodiments, the processing circuitry 1176 can be configured to run software to perform the method described herein in respect of the client 1100. The software may be containerised according to some embodiments. Thus, in some embodiments, the processing circuitry 1176 may be configured to run a container to perform the method described herein in respect of the client 1100.

Briefly, the processing circuitry 1176 of the client 1100 is configured establish a connection between the client device and the server for a transport protocol.

As illustrated in FIG. 11, in some embodiments, the client 1100 may optionally comprise a client memory 1177. The memory 1177 of the client 1100 can comprise a volatile memory or a non-volatile memory. In some embodiments, the memory 1177 of the client 1100 may comprise a non-transitory media. Examples of the memory 1177 of the client 1100 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 1176 of the client 1100 can be connected to the memory 1177 of the client 1100. In some embodiments, the memory 1177 of the client 1100 may be for storing program code or instructions which, when executed by the processing circuitry 1176 of the client 1100, cause the client 1100 to operate in the manner described herein in respect of the client 1100. For example, in some embodiments, the memory 1177 of the client 1100 may be configured to store program code or instructions that can be executed by the processing circuitry 1176 of the client 1100 to cause the client 1100 to operate in accordance with the method described herein in respect of the client 1100. Alternatively or in addition, the memory 1177 of the client 1100 can be configured to store any information, data, messages, requests, responses, indications, notifications, signals, or similar, that are described herein. The processing circuitry 1176 of the client 1100 may be configured to control the memory 1177 of the client 1100 to store information, data, messages, requests, responses, indications, notifications, signals, or similar, that are described herein.

In some embodiments, as illustrated in FIG. 11, the client 1100 may optionally comprise a client communications interface 1178. The communications interface 1178 of the client 1100 can be connected to the processing circuitry 1176 of the client 1100 and/or the memory 1177 of client 1100. The communications interface 1178 of the client 1100 may be operable to allow the processing circuitry 1176 of the client 1100 to communicate with the memory 1177 of the client 1100 and/or vice versa. Similarly, the communications interface 1178 of the client 1100 may be operable to allow the processing circuitry 1176 of the client 1100 to communicate with the proxy and/or the server. The communications interface 1178 of the client 1100 can be configured to transmit and/or receive information, data, messages, requests, responses, indications, notifications, signals, or similar, that are described herein. In some embodiments, the processing circuitry 1176 of the client 1100 may be configured to control the communications interface 1178 of the client 1100 to transmit and/or receive information, data, messages, requests, responses, indications, notifications, signals, or similar, that are described herein. The communications interface 1178 of the client may be configured to communicate with the proxy and/or the server.

Although the client 1100 is illustrated in FIG. 11 as comprising a single memory 1177, it will be appreciated that the client 1100 may comprise at least one memory (i.e. a single memory or a plurality of memories) 1177 that operate in the manner described herein. Similarly, although the client 1100 is illustrated in FIG. 11 as comprising a single communications interface 1178, it will be appreciated that the client 1100 may comprise at least one communications interface (i.e. a single communications interface or a plurality of communications interface) 1178 that operate in the manner described herein. It will also be appreciated that FIG. 11 only shows the components required to illustrate an embodiment of the client 1100 and, in practical implementations, the client 1100 may comprise additional or alternative components to those shown.

The proxy 1004 of FIG. 10 and the client 1100 of FIG. 11 may be comprised in a communications system.

Figure 12:
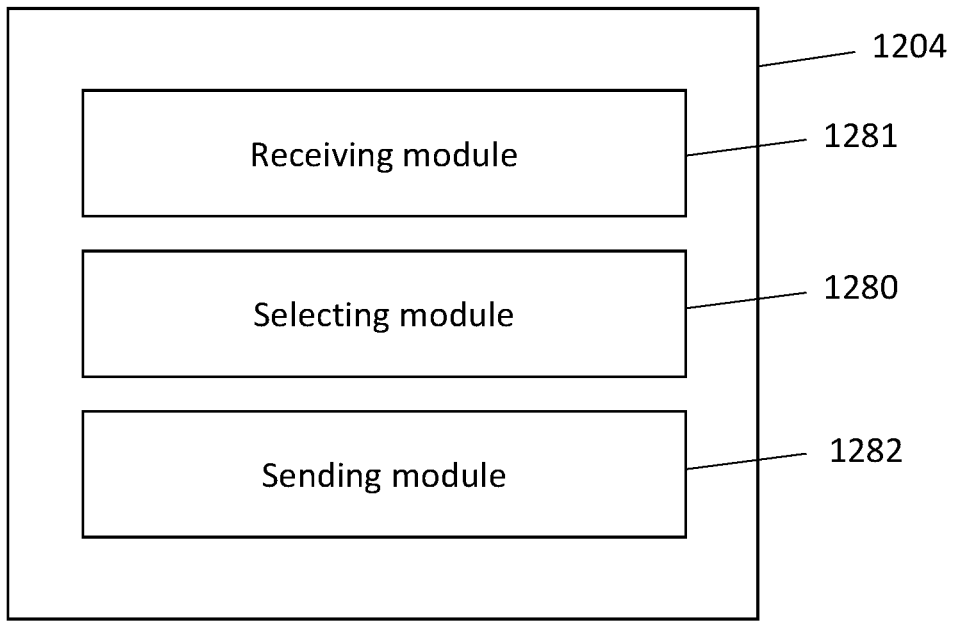
FIG. 12 is a diagram illustrating a proxy according to an example.

FIG. 12 illustrates a proxy 1204 according to an embodiment, the proxy 1204 comprising a receiving module 1281 configured to receive, from the client, a plurality of transport protocol setup messages, a selecting module 1280 configured to select at least one transport protocol setup message from the plurality of transport protocol setup messages, and a sending module 1282 configured to send at least one transport protocol setup message to the server based on the selected at least one transport protocol setup message, and responsive to receiving from the server at least one transport protocol setup response message corresponding to a transport protocol setup message sent to the server, sending a transport protocol setup response message corresponding to a received transport protocol setup response message to the client.

Figure 13:
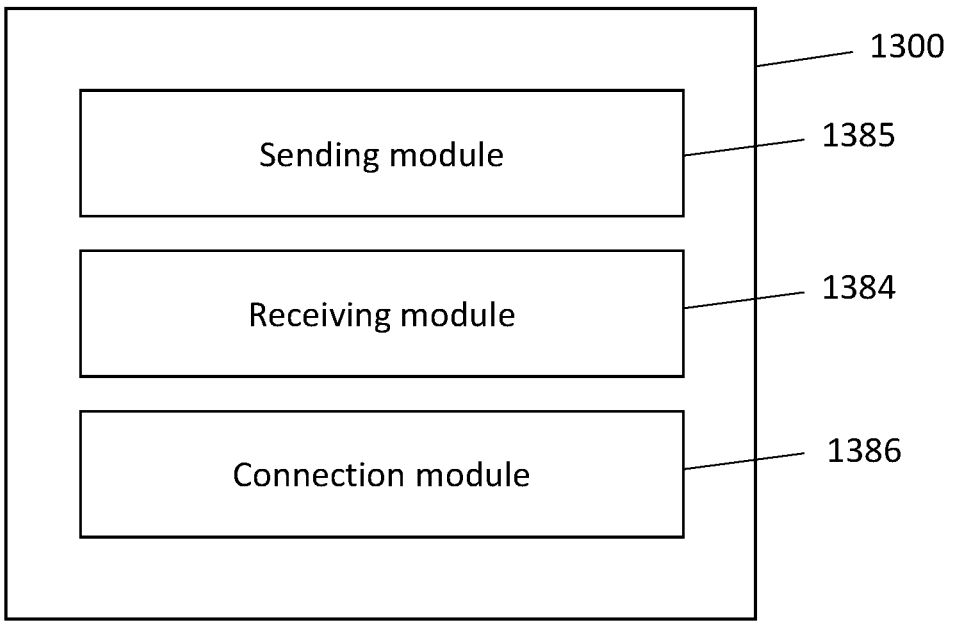
FIG. 13 is a diagram illustrating a client according to an example.

FIG. 13 illustrates client 1300 according to an embodiment, the client 1300 comprising a sending module 1385 configured to send a request for a proxy service to a proxy and send a plurality of transport protocol setup messages to the proxy, a receiving module 1384 configured to receive from the proxy a transport protocol setup response message and a connection module 1386 configured to establish a connection between the client device and the server for a transport protocol corresponding to the transport protocol setup response message.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method, in a proxy, for establishing a transport protocol to use between a client and a server, the method comprising:
   receiving, from the client, a plurality of transport protocol setup messages;
   selecting at least one transport protocol setup message from the plurality of transport protocol setup messages;
   sending at least one transport protocol setup message to the server based on the selected at least one transport protocol setup message; and
   responsive to receiving from the server at least one transport protocol setup response message corresponding to a transport protocol setup message sent to the server, sending a transport protocol setup response message corresponding to a received transport protocol setup response message to the client.

2. The method as claimed in claim 1, wherein at least one of the selecting and sending of the at least one transport protocol setup message is based on information of at least one of:
   client connection preferences; policy relating to the client; policy relating to the server; and
   server capability information.

3. The method as claimed in 2, wherein the client connection preferences comprise at least one of:
   that a proxy is to send multiple transport protocol setup messages to the server in parallel; that the proxy is not to send multiple transport protocol setup messages to the server in parallel; a list of transport protocols supported by the client;
   a transport protocol preferred by the client; a type of transport protocol preferred by the client; a version of a transport protocol preferred by the client;
   an extension of a transport protocol preferred by the client;
   an order in which transport protocols are preferred by the client;

preferences of the client with regards to server capability information.

4. The method as claimed in claim 1, wherein the method further comprises:

ordering the plurality of transport protocol setup messages by preference based on at least one of: client connection preferences, policy relating to the client, policy relating to the server; and server capability information; and selecting the at least one transport protocol setup message to send to the server based on the order of preference.

5. The method as claimed in claim 4, wherein the method further comprises receiving, from the client, the client connection preferences relating to at least one transport protocol.

6. The method as claimed in claim 1, wherein the selecting of the at least one transport protocol setup message from the plurality of transport protocol setup messages comprises selecting at least one of:

a set of transport protocol setup messages; a preferred transport protocol setup message;

an acceptable transport protocol setup message;

a set of preferred transport protocol setup messages.

7. The method as claimed in claim 1, wherein when more than one transport protocol setup response message is received from the server, the method further comprises determining the transport protocol setup response message corresponding to one of the received transport protocol setup response messages to send to the client.

8. The method as claimed in claim 7, wherein the determined transport protocol setup response message is the transport protocol setup response message which has the highest preference from among the received at least one transport protocol setup response message.

9. The method as claimed in claim 7, wherein the determined transport protocol setup response message is determined based on information of at least one of: client connection preferences;

policy relating to the client; policy relating to the server; and server capability information.

10. The method as claimed in claim 1, the method further comprising, if no transport protocol setup response message is received from the server, indicating a connection error to the client.

11. The method as claimed in claim 1, wherein the method further comprises waiting for a predetermined period of time to receive the transport protocol setup response message from the server, and responsive to receiving the transport protocol setup response message within the predetermined period of time, sending the transport protocol setup response message corresponding to the received transport protocol setup response message to the client.

12. The method as claimed in claim 1, wherein, when the proxy is not to send messages in parallel to the server, the sending the at least one transport protocol setup message to the server comprises:

sending a preferred transport protocol setup message to the server; and responsive to receiving from the server a preferred transport protocol setup response message corresponding to the preferred transport protocol setup message within a first period of time, sending a preferred transport protocol setup response message to the client.

13. The method as claimed in claim 12, the method further comprising:

responsive to not receiving from the server the preferred transport protocol setup response message corresponding to the preferred transport protocol setup within the first period of time, sending an acceptable transport protocol setup message to the server, and responsive to receiving from the server an acceptable transport protocol setup response message corresponding to the acceptable transport protocol setup message, sending an acceptable transport protocol setup response message to the client.

14. The method as claimed in claim 1, wherein, when the proxy is to send messages in parallel to the server, the sending the at least one transport protocol setup message to the server comprises:

sending a preferred transport protocol setup message and an acceptable protocol setup message to the server;

responsive to receiving from the server an acceptable transport protocol setup response message corresponding to the acceptable transport protocol setup message, starting a first timer for a first period of time;

responsive to receiving from the server a preferred transport protocol setup response message corresponding to the preferred transport protocol setup message within the first period of time, sending a preferred transport protocol setup response message to the client; and responsive to not receiving from the server the preferred transport protocol setup response message corresponding to the preferred transport protocol setup message within the first period of time, sending an acceptable transport protocol setup response message to the client.

15. The method as claimed in claim 1, wherein the method further comprises establishing a proxy connection with the client.

16. A method in a client for establishing a transport protocol to use between the client and a server, the method comprising:

sending a request for a proxy service to a proxy;

sending a plurality of transport protocol setup messages to the proxy;

receiving from the proxy a transport protocol setup response message; and establishing a connection between the client and the server for a transport protocol corresponding to the transport protocol setup response message.

17. The method as claimed in claim 16, wherein the method further comprises sending connection preferences to a proxy client.

18. The method as claimed in claim 16, wherein the method further comprises sending the plurality of transport protocol setup messages in parallel.

19. A proxy comprising:

at least one processor; and at least one memory, the at least one memory containing instructions executable by the at least one processor, whereby the proxy is operable to:

receive, from a client, a plurality of transport protocol setup messages;

select at least one transport protocol setup message from the plurality of transport protocol setup messages;

send the selected at least one transport protocol setup message to a server; and responsive to receiving from the server at least one transport protocol setup response message corresponding to a selected transport protocol setup message sent to the server, send a transport protocol setup response message corresponding to a received transport protocol setup response message to the client.

20. A client comprising:

at least one processor; and at least one memory, the at least one memory containing instructions executable by the at least one processor, whereby the client is operable to:

send a request for a proxy service to a proxy;

send a plurality of transport protocol setup messages to the proxy;

receive from the proxy a transport protocol setup response message; and establish a connection between the client and a server for a transport protocol corresponding to the transport protocol setup response message.

\* \* \* \* \*